(12) United States Patent
Beck et al.

(10) Patent No.: US 9,194,464 B2
(45) Date of Patent: Nov. 24, 2015

(54) MULTI-SPEED GEARBOX

(71) Applicant: ZF Friedrichshafen AG, Friedrichshafen (DE)

(72) Inventors: Stefan Beck, Eriskirch (DE); Christian Sibla, Friedrichshafen (DE); Wolfgang Rieger, Friedrichshafen (DE)

(73) Assignee: ZF Friedrichshafen AG, Friedrichshafen (DE)

( * ) Notice: Subject to any disclaimer, the term of this patent is extended or adjusted under 35 U.S.C. 154(b) by 0 days.

(21) Appl. No.: 14/396,084

(22) PCT Filed: Mar. 13, 2013

(86) PCT No.: PCT/EP2013/055058
§ 371 (c)(1),
(2) Date: Oct. 22, 2014

(87) PCT Pub. No.: WO2013/159989
PCT Pub. Date: Oct. 31, 2013

(65) Prior Publication Data
US 2015/0094185 A1    Apr. 2, 2015

(30) Foreign Application Priority Data

Apr. 27, 2012   (DE) .......................... 10 2012 207 081

(51) Int. Cl.
*F16H 3/66* (2006.01)
*F16H 3/44* (2006.01)

(52) U.S. Cl.
CPC ............ *F16H 3/66* (2013.01); *F16H 2003/445* (2013.01); *F16H 2200/0065* (2013.01); *F16H 2200/0069* (2013.01); *F16H 2200/0086* (2013.01); *F16H 2200/2012* (2013.01);

(Continued)

(58) Field of Classification Search
None
See application file for complete search history.

(56) References Cited

U.S. PATENT DOCUMENTS

| 6,960,149 B2 | 11/2005 | Ziemer |
| 7,695,398 B2 | 4/2010 | Phillips et al. |

(Continued)

FOREIGN PATENT DOCUMENTS

| DE | 101 15 995 A1 | 10/2002 |
| DE | 10 2008 031 970 A1 | 1/2009 |

(Continued)

OTHER PUBLICATIONS

German Search Report Corresponding to 10 2012 207 031.1 mailed Dec. 19, 2012.

(Continued)

*Primary Examiner* — Justin Holmes
(74) *Attorney, Agent, or Firm* — Davis & Bujold, P.L.L.C.; Michael J. Bujold (57) ABSTRACT

A four-stage multi-stage transmission, in which a ring gear of a first planetary gear set is connected to a sun gear of a fourth planetary gear set, a ring gear of the fourth planetary gear set is connected to the output shaft, a sun gear of the first planetary gear set and a carrier of a second planetary gear set are couplable to the housing via a first brake, a carrier of the first planetary gear set is couplable to the housing via a second brake, the drive shaft is couplable to the carrier of the fourth planetary gear set via a first clutch, and a ring gear is couplable to the sun gear of the fourth planetary gear set via a second clutch. Adjustment of further couplings, within the multi-stage transmission, facilitates a set of gears having similar properties.

15 Claims, 5 Drawing Sheets

(52) U.S. Cl.
CPC . *F16H2200/2046* (2013.01); *F16H 2200/2094* (2013.01)

(56) References Cited

U.S. PATENT DOCUMENTS

| | | | |
|---|---|---|---|
| 8,210,981 | B2 | 7/2012 | Bauknecht et al. |
| 8,398,522 | B2 | 3/2013 | Bauknecht et al. |
| 8,864,618 | B1 * | 10/2014 | Noh et al. .................... 475/278 |
| 2007/0225108 | A1 * | 9/2007 | Kamm et al. ................. 475/275 |
| 2008/0015080 | A1 * | 1/2008 | Kamm et al. ................. 475/275 |
| 2009/0197734 | A1 | 8/2009 | Phillips et al. |
| 2012/0178578 | A1 * | 7/2012 | Mellet et al. ................. 475/254 |

FOREIGN PATENT DOCUMENTS

| | | |
|---|---|---|
| DE | 10 2008 038 210 A1 | 3/2009 |
| DE | 10 2008 000 428 A1 | 9/2009 |
| DE | 10 2008 000 429 A1 | 9/2009 |
| DE | 10 2008 041 196 A1 | 2/2010 |
| DE | 10 2008 041 200 A1 | 2/2010 |
| DE | 10 2008 041 209 A1 | 2/2010 |
| DE | 10 2009 020 442 A1 | 11/2010 |
| DE | 10 2009 028 670 A1 | 2/2011 |
| DE | 10 2009 047 279 A1 | 6/2011 |
| JP | 2005-083479 A | 3/2005 |
| JP | 2006-349153 A | 12/2006 |

OTHER PUBLICATIONS

German Search Report Corresponding to 10 2012 207 043.5 mailed Nov. 13, 2012.
German Search Report Corresponding to 10 2012 207 081.8 mailed Dec. 19, 2012.
German Search Report Corresponding to 10 2012 207 085.0 mailed Dec. 19, 2012.
German Search Report Corresponding to 10 2012 207 091.5 mailed Dec. 19, 2012.
German Search Report Corresponding to 10 2012 207 092.3 mailed Dec. 19, 2012.
International Search Report Corresponding to PCT/EP2013/055061 mailed May 21, 2013.
International Search Report Corresponding to PCT/EP2013/055060 mailed May 21, 2013.
International Search Report Corresponding to PCT/EP2013/055058 mailed May 21, 2013.
International Search Report Corresponding to PCT/EP2013/055057 mailed May 21, 2013.
International Search Report Corresponding to PCT/EP2013/055062 mailed May 21, 2013.
International Search Report Corresponding to PCT/EP2013/055059 mailed May 21, 2013.
Written Opinion Corresponding to PCT/EP2013/055058 mailed May 21, 2013.

* cited by examiner

| GEAR | ENGAGED SHIFT ELEMENT | | | | | | GEAR RATIO $i$ | GEAR INTERVAL $\varphi$ |
|---|---|---|---|---|---|---|---|---|
| | BRAKE | | CLUTCH | | | | | |
| | 51 | 52 | 63 | 61 | 64 | 62 | | |
| 1 | x | | | | x | x | 4.699 | |
| | | | | | | | | 1.625 |
| 2 | x | x | | | x | | 2.893 | |
| | | | | | | | | 1.585 |
| 3 | x | | x | | x | | 1.848 | |
| | | | | | | | | 1.386 |
| 4 | | x | x | | x | | 1.334 | |
| | | | | | | | | 1.334 |
| 5 | | | x | x | x | | 1.000 | |
| | | | | | | | | 1.234 |
| 6 | | x | | x | x | | 0.810 | |
| | | | | | | | | 1.173 |
| 7 | | x | x | x | | | 0.691 | |
| | | | | | | | | 1.123 |
| 8 | x | x | | x | | | 0.615 | |
| | | | | | | | | 1.120 |
| 9 | x | | x | x | | | 0.549 | |
| R | x | | x | | | x | -3.200 | TOTAL 8.554 |
| Z | | x | | | x | x | -1.220 | |
| Z | | x | x | | | x | 3.520 | |
| M | | | x | x | x | | 1.000 | |

Fig. 11

MULTI-SPEED GEARBOX

This application is a National Stage completion of PCT/EP2013/055058 filed Mar. 13, 2013, which claims priority from German patent application serial no. 10 2012 207 081.8 filed Apr. 27, 2012.

FIELD OF THE INVENTION

The invention relates to a multi-stage transmission in planetary design, in particular for a motor vehicle.

BACKGROUND OF THE INVENTION

Such multi-stage transmissions are preferably used as automatic transmissions of motor vehicles, wherein the power flow within the planetary sets that are active in the respective gear step is defined by a targeted actuation of the shift elements. In an automatic transmission, the planetary sets are usually also connected to a start-up element, such as, for example, a hydrodynamic torque converter or a hydraulic clutch, which is subject to a slip effect and which is optionally provided with a bypass clutch.

There is known from DE 10 2008 000 428 A1 a multi-stage transmission in planetary design, in which there are arranged in a housing four planetary sets as well as a total of eight rotatable shafts, of which one is the drive shaft and another is the output shaft of the multi-stage transmission. Furthermore, there are provided in the region of the shafts at least six shift elements, the targeted actuation of which serves to vary the power flow within the four planetary sets and thus to define different transmission ratios between the drive shaft and the output shaft. As a result, it is possible to shift a total of nine forward gears and one reverse gear.

SUMMARY OF THE INVENTION

The problem addressed by the invention is that of specifying an alternative multi-stage transmission, preferably with an improved efficiency and with a transmission ratio range that is sufficiently large and sufficiently uniformly distributed.

The problem addressed by the invention is solved by a multi-stage transmission comprising at least four planetary gear sets, a housing, a drive shaft and an output shaft, wherein a ring gear of a first planetary gear set is permanently connected to a sun gear of a fourth planetary gear set, a ring gear of the fourth planetary gear set is permanently connected to the output shaft, a sun gear of the first planetary gear set and a carrier of a second planetary gear set can be coupled to the housing via a first brake, a carrier of the first planetary gear set can be coupled to the housing via a second brake, the carrier can be coupled to the sun gear, the ring gear can be coupled to the sun gear or the ring gear can be coupled to the carrier in each case of the third planetary gear set or the drive shaft can be coupled to the carrier of the fourth planetary gear set via a first clutch, a ring gear can be coupled to the sun gear or the ring gear can be coupled to the carrier or the sun gear can be coupled to the carrier, in each case, of the fourth planetary gear set via a second clutch, and three of the following five connections are configured as permanent connections and two of the connections are configured such as to be able to be released by means of at least one shift element:

connection of the drive shaft to a sun gear of the second planetary gear set, connection of the drive shaft to a sun gear of a third planetary gear set, connection of a ring gear of the third planetary gear set to the carrier of the second planetary gear set, connection of a carrier of the third planetary gear set to the carrier of the fourth planetary gear set, and connection of a ring gear of the first planetary gear set to a ring gear of the second planetary gear set.

A planetary gear set is understood in particular to mean a gear set which comprises at least one sun gear with which one or more planetary gears mesh, a carrier which determines the axes of the planetary gears, and a ring gear with which the planetary gears mesh. Preferably the ring gear has an inner gearing and the sun gear has an outer gearing.

One advantage of the invention may be that the shift elements of the multi-stage transmission, that is to say the brakes and clutches of the transmission, can easily be reached from outside. The actuators, such as for example electric motors, hydraulic valves, hydraulic pumps and the like, can thus be arranged in the vicinity of the shift elements, as a result of which mechanical and/or hydraulic losses are reduced and less energy may be required for actuating the shift elements. Less energy may also be required in order to keep the shift element in its respective current operating state, that is to say engaged or disengaged, for example since the pressure losses are also lower due to short lines. It is thus also possible to arrange shift elements on the housing and thus at least partially in a rotationally fixed manner, as a result of which, seals which connect a stationary line to a rotating line can be entirely or partially avoided.

The spatial arrangement of the easily reachable shift elements also makes it easier to replace the lamellar clutches or brakes, which are usually actuated hydraulically, with for example brakes and clutches which are actuated electromechanically or electrohydraulically and which can be actuated comparatively easily according to demand. Easily reachable shift elements are, on the one hand, brakes, which couple a shaft to the housing in a rotationally fixed manner, but also shift elements on outer shafts of the multi-stage transmission, preferably on the drive shaft or output shaft, which can in a comparatively easy manner be supplied with the hydraulic fluid that is necessary for actuation.

Besides this property, the multi-stage transmission also has a good gearing efficiency, only small loads on the components, in particular low planetary set and shift element torques, low absolute and relative speeds of rotation and/or a low construction complexity. The latter makes it possible to implement the multi-stage transmission with only a low weight and low costs. Finally, the multi-stage transmission also permits a good transmission ratio range, that is to say a highly practical stepping of the gears.

In general, one preferred embodiment of the multi-stage transmission comprises four planetary gear sets, four clutches, two brakes and no fixed housing coupling.

By actuating, in each case, two shift elements (brakes and/or clutches), nine forward gears and one reverse gear can be shifted, one further alternative shift position being available for the fifth gear. In addition, the transmission permits the shifting of one additional forward gear and one additional reverse gear.

As start-up elements, use may be made of a hydrodynamic torque converter, a hydrodynamic clutch, an additional start-up clutch, an integrated start-up clutch or brake and/or an additional electric machine.

In principle, an electric machine or another power source can be arranged on each shaft. In principle, a freewheel to the housing or to another shaft can also be arranged on each shaft.

The multi-stage transmission is preferably implemented as a standard drive, but a front-transverse design is also conceivable.

All the shift elements can act in a friction-locking or form-locking manner. Preferably, however, the second clutch and/or the fourth clutch (in further transmission variants the fifth or sixth clutch instead of the fourth clutch) are configured as form-locking clutches, in particular as claw clutches, which leads to considerably improved efficiency and thus to considerable advantages in terms of fuel consumption.

It has been found that the second and the fourth clutch (or fifth or sixth clutch) have to be actuated just once when shifting from the first to the ninth gear, and that these shift elements are therefore particularly suitable for being configured as claw clutches. It has also been found that for these shift elements, due to their comparatively seldom actuation, the advantage of better efficiency outweighs the disadvantage of more difficult handling.

The geometric position (order) of the individual gear sets and shift elements can be selected freely, as long as it permits the connection of the elements. The position of individual elements can thus be moved at will.

Further advantageous variants of the multi-stage transmission emerge from the description in conjunction with the figures. In terms of function, these all have the same properties as the main system, in particular similar efficiency, similar stepping, etc.

BRIEF DESCRIPTION OF THE DRAWINGS

For the sake of better understanding of the invention, they will be explained in more detail with reference to the following figures.

In the figures, which each show a highly schematic, simplified representation.

DETAILED DESCRIPTION OF THE PREFERRED EMBODIMENTS

By way of introduction, it should be noted that in the different described embodiments the same parts are provided with the same reference characters and the same component names, wherein the disclosures contained throughout the entire description can be correspondingly transferred to identical parts bearing the same reference characters and/or the same component names. In addition, the position details selected in the description, such as for example top, bottom, side, etc., are based on the figure that is being directly described and shown and, in the event of a change in position, are to be correspondingly transferred to the new position. Furthermore, individual features or combinations of features from the different example embodiments that are shown and described can also represent stand-alone inventive solutions or solutions according to the invention.

Figure 1:
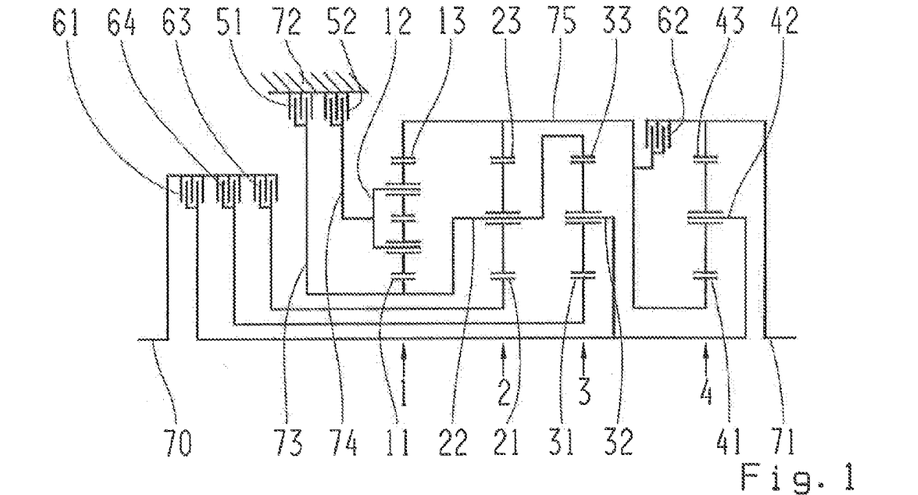
FIG. 1 shows a first example variant, shown schematically, of a multi-stage transmission according to the invention.

FIG. 1 shows a multi-stage transmission comprising four planetary gear sets 1, 2, 3, 4, a drive shaft 70, an output shaft 71, six further rotatable shafts 73, 74, 75, 76, 77, 78, and six shift elements 51, 52, 61, 62, 63, 64, of which two are brakes 51, 52 and four are clutches 61, 62, 63, 64. The four planetary gear sets 1, 2, 3, 4 are arranged one behind the other in the following order: first planetary gear set 1, second planetary gear set 2, third planetary gear set 3, fourth planetary gear set 4. The first planetary gear set 1 is configured as a plus planetary gear set; the second planetary gear set 2, the third planetary gear set 3 and the fourth planetary gear set 4 are configured as minus planetary gear sets. The planetary gear sets 1, 2, 3, 4 are jointly enclosed by a housing 72. In the variant of the multi-stage transmission of FIG. 1 a ring gear 13 of a first planetary gear set 1 is permanently connected to a sun gear 41 of a fourth planetary gear set 4, a ring gear 43 of the fourth planetary gear set 4 is permanently connected to the output shaft 71, a sun gear 11 of the first planetary gear set 1 and a carrier 22 of a second planetary gear set 2 can be coupled to the housing 72 via a first brake 51, a carrier 12 of the first planetary gear set 1 can be coupled to the housing 72 via a second brake 52, the carrier 32 of the third planetary gear set 3 and the carrier 42 of the fourth planetary gear set 4 can be coupled to the drive shaft 70 via a first clutch 61, a ring gear 43 can be coupled to the sun gear 41 in each case of the fourth planetary gear set 4 via a second clutch 62, the drive shaft 70 can be coupled to the sun gear 21 of the second planetary gear set 2 via a third clutch 63, the drive shaft 70 can be coupled to the sun gear 31 of the third planetary gear set 3 via a fourth clutch 64, the ring gear 33 of the third planetary gear set 3 is permanently connected to the carrier 22 of the second planetary gear set 2, the carrier 32 of the third planetary gear set 3 is permanently connected to the carrier 42 of the fourth planetary gear set 4, and the ring gear 13 of the first planetary gear set 1 is permanently connected to the ring gear 23 of the second planetary gear set 2.

Figure 2:
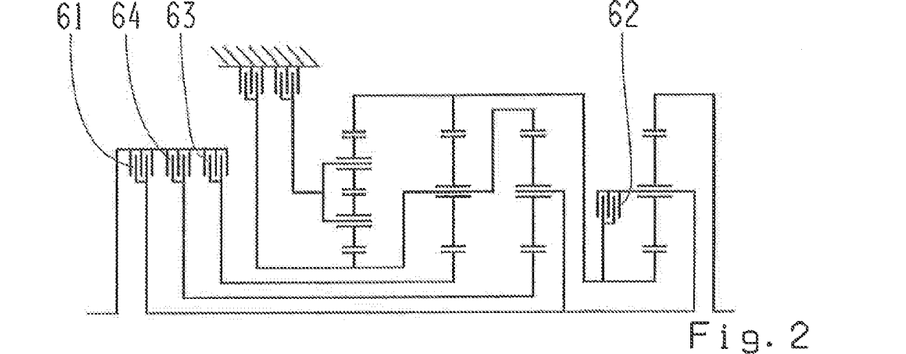
FIG. 2 shows a second example variant, shown schematically, of a multi-stage transmission according to the invention.

FIG. 2 shows a multi-stage transmission which is very similar to the multi-stage transmission of FIG. 1 and differs from the embodiment of FIG. 1 in the following points:

the sun gear 41 of the fourth planetary gear set 4 can be coupled not to the ring gear 43 of the fourth planetary gear set 4 but rather to the carrier 42 of the fourth planetary gear set 4 via a second clutch 62.

Figure 3:
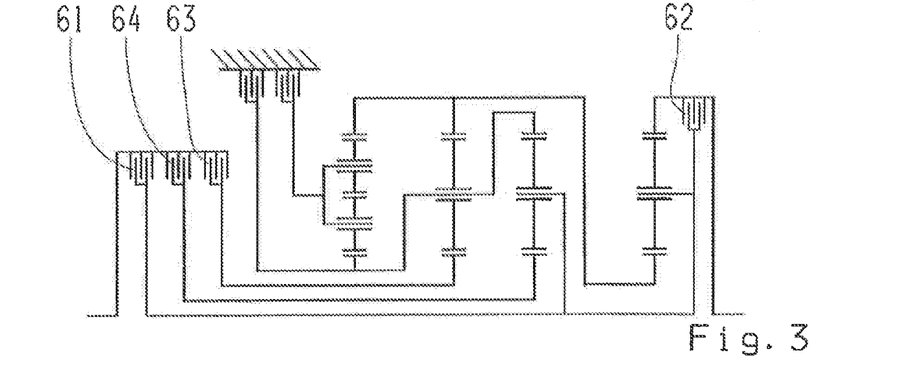
FIG. 3 shows a third example variant, shown schematically, of a multi-stage transmission according to the invention.

FIG. 3 shows a multi-stage transmission which is very similar to the multi-stage transmission of FIG. 1 and differs from the embodiment of FIG. 1 in the following points:

the ring gear 43 of the fourth planetary gear set 4 can be coupled not to the sun gear 41 of the fourth planetary gear set 4 but rather to the carrier 42 of the fourth planetary gear set 4 via a second clutch 62.

It is noted at this point that the variants shown in FIG. 2 and FIG. 3 regarding the position of the second clutch 62 can also be applied to the following transmission variants. That is to say that, in the following transmission variants too, the second clutch 62 is not necessarily arranged between the ring gear 43 and the sun gear 41 but rather may also be arranged between the sun gear 41 and the carrier 42 or between the ring gear 43 and the carrier 41.

Figure 4:
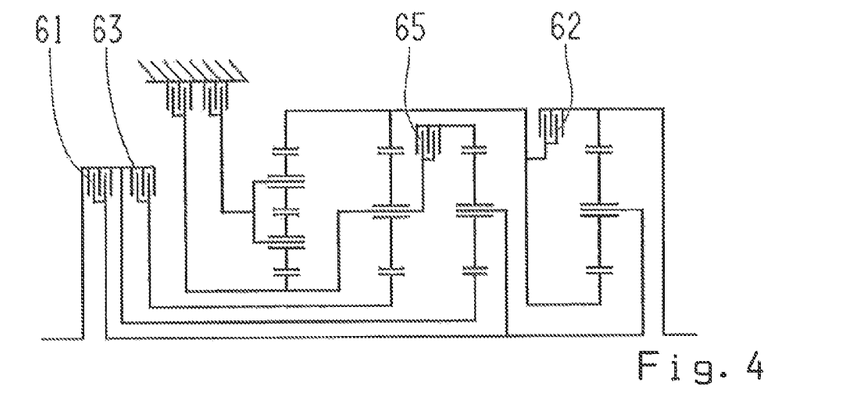
FIG. 4 shows a fourth example variant, shown schematically, of a multi-stage transmission according to the invention.

FIG. 4 shows a multi-stage transmission which is very similar to the multi-stage transmission of FIG. 1 and differs from the embodiment of FIG. 1 in the following points:

the drive shaft 70 is permanently connected to the sun gear 31 of the third planetary gear set 3, and the ring gear 33 of the third planetary gear set 3 can be coupled to the carrier 22 of the second planetary gear set 2 via a fifth clutch 65.

Figure 5:
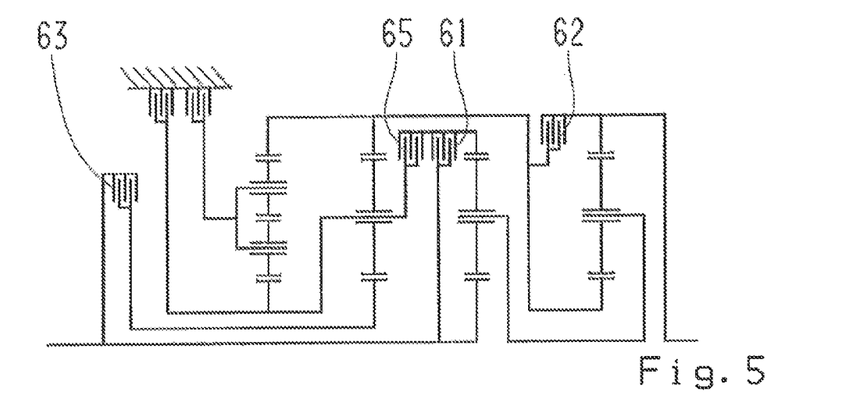
FIG. 5 shows a fifth example variant, shown schematically, of a multi-stage transmission according to the invention.

FIG. 5 shows a multi-stage transmission which is very similar to the multi-stage transmission of FIG. 4 and differs from the embodiment of FIG. 4 in the following points:

the sun gear 31 of the third planetary gear set 3 can be coupled not to the carrier 32 of the third planetary gear set 3 but rather to the ring gear 33 of the third planetary gear set 3 via a first clutch 61.

Figure 6:
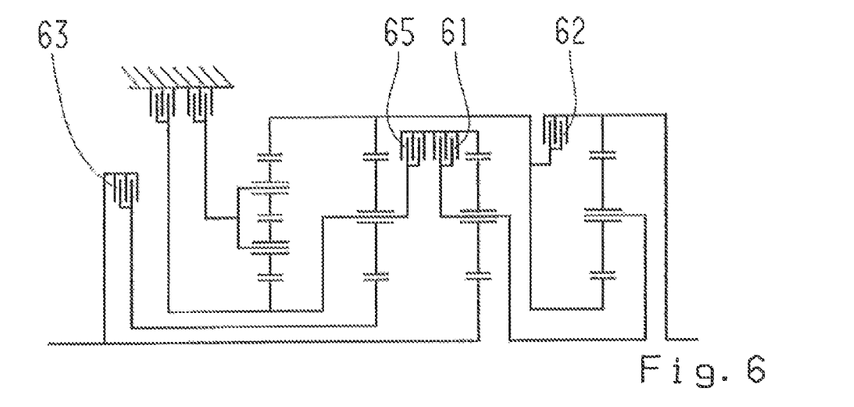
FIG. 6 shows a sixth example variant, shown schematically, of a multi-stage transmission according to the invention.

FIG. 6 shows a multi-stage transmission which is very similar to the multi-stage transmission of FIG. 4 and differs from the embodiment of FIG. 4 in the following points:

the carrier 32 of the third planetary gear set 3 can be coupled not to the sun gear 31 of the third planetary gear set 3 but rather to the ring gear 33 of the third planetary gear set 3 via a first clutch 61.

Figure 9:
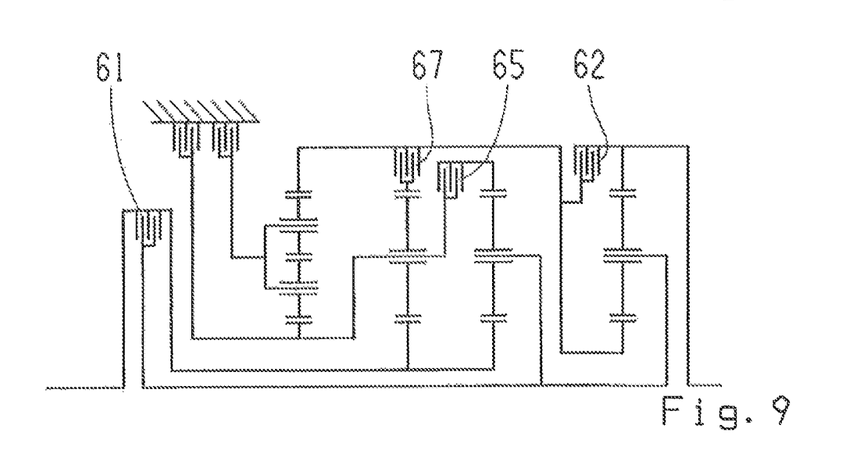
FIG. 9 shows a ninth example variant, shown schematically, of a multi-stage transmission according to the invention.

It is noted at this point that the variants shown in FIG. 5 and FIG. 6 regarding the position of the first clutch 61 can also be applied to the transmission variant shown in FIG. 9. That is to say that, in said transmission variant too, the first clutch 61 is not necessarily arranged between the sun gear 31 and the carrier 32 but rather may also be arranged between the sun gear 31 and the ring gear 33 or between the ring gear 33 and the carrier 32.

Figure 7:
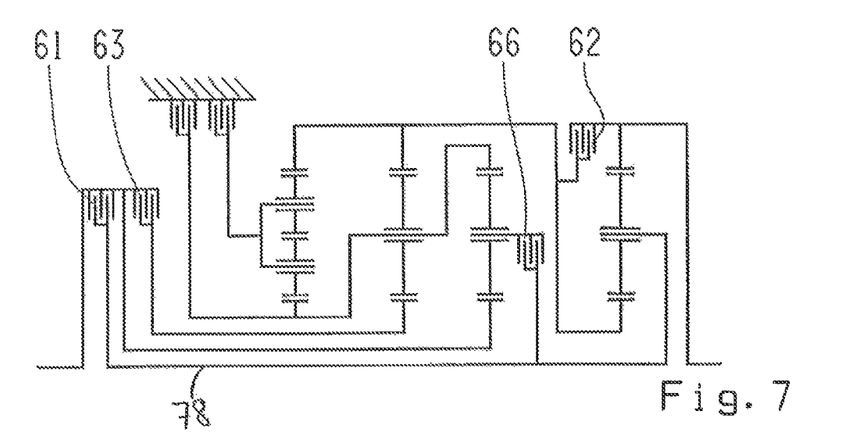
FIG. 7 shows a seventh example variant, shown schematically, of a multi-stage transmission according to the invention.

FIG. 7 shows a multi-stage transmission which is very similar to the multi-stage transmission of FIG. 1 and differs from the embodiment of FIG. 1 in the following points:

the drive shaft 70 is permanently connected to the sun gear 31 of the third planetary gear set 3, and the carrier 32 of the third planetary gear set 3 can be coupled to the carrier 42 of the fourth planetary gear set 4 and to the shaft 78 via a sixth clutch 66.

Figure 8:
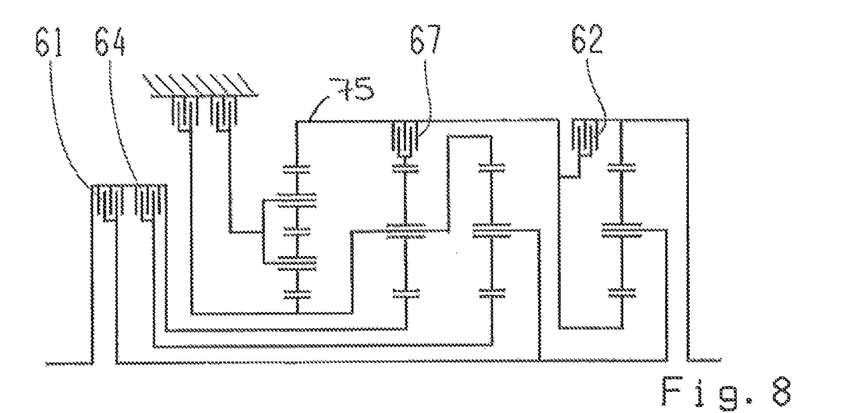
FIG. 8 shows an eighth example variant, shown schematically, of a multi-stage transmission according to the invention.

FIG. 8 shows a multi-stage transmission comprising four planetary gear sets 1, 2, 3, 4, a drive shaft 70, an output shaft 71, three further rotatable shafts 73, 74, 75, and six shift elements 51, 52, 61, 62, 63, 64, of which two are brakes 51, 52 and four are clutches 61, 62, 63, 64. The four planetary gear sets 1, 2, 3, 4 are arranged one behind the other in the following order: first planetary gear set 1, second planetary gear set 2, third planetary gear set 3, fourth planetary gear set 4. The first planetary gear set 1 is configured as a plus planetary gear set; the second planetary gear set 2, the third planetary gear set 3 and the fourth planetary gear set 4 are configured as minus planetary gear sets. The planetary gear sets 1, 2, 3, 4 are jointly enclosed by a housing 72. In the variant of the multi-stage transmission of FIG. 1 a ring gear 13 of a first planetary gear set 1 is permanently connected to a sun gear 41 of a fourth planetary gear set 4, a ring gear 43 of the fourth planetary gear set 4 is permanently connected to the output shaft 71, a sun gear 11 of the first planetary gear set 1 and a carrier 22 of a second planetary gear set 2 can be coupled to the housing 72 via a first brake 51, a carrier 12 of the first planetary gear set 1 can be coupled to the housing 72 via a second brake 52, the carrier 32 can be coupled to the sun gear 31, the ring gear 33 can be coupled to the sun gear 31 or the ring gear 33 can be coupled to the carrier 32, in each case, of the third planetary gear set 3 or the drive shaft 70 can be coupled to the carrier 42 of the fourth planetary gear set 4 via a first clutch 61, a ring gear 43 can be coupled to the sun gear 41 or the ring gear 43 can be coupled to the carrier 42 or the sun gear 41 can be coupled to the carrier 42, in each case, of the fourth planetary gear set 4 via a second clutch 62, the drive shaft 70 is permanently connected to the sun gear 21 of the second planetary gear set 2, the drive shaft 70 can be coupled to the sun gear 31 of the third planetary gear set 3 via a fourth clutch 64, the ring gear 33 of the third planetary gear set 3 is permanently connected to the carrier 22 of the second planetary gear set 2, the carrier 32 of the third planetary gear set 3 is permanently connected to the carrier 42 of the fourth planetary gear set 4, and the ring gear 13 of the first planetary gear set 1 can be coupled to the ring gear 23 of the second planetary gear set 2 via a seventh clutch 67.

FIG. 9 shows a multi-stage transmission which is very similar to the multi-stage transmission of FIG. 8 and differs from the embodiment of FIG. 8 in the following points:

the drive shaft 70 is permanently connected to the sun gear 31 of the third planetary gear set 3, and the ring gear 33 of the third planetary gear set 3 can be coupled to the carrier 22 of the second planetary gear set 2 via a fifth clutch 65.

Figure 10:
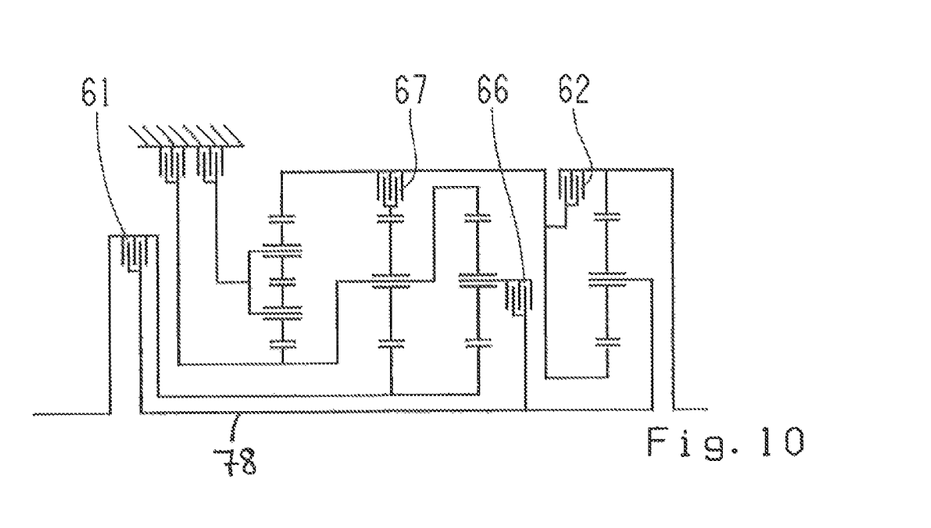
FIG. 10 shows a tenth example variant, shown schematically, of a multi-stage transmission according to the invention.

FIG. 10 shows a multi-stage transmission which is very similar to the multi-stage transmission of FIG. 8 and differs from the embodiment of FIG. 8 in the following points:

the drive shaft 70 is permanently connected to the sun gear 31 of the third planetary gear set 3, and the carrier 32 of the third planetary gear set 3 can be coupled to the carrier 42 of the fourth planetary gear set 4 and to the shaft 78 via a sixth clutch 66.

In all the multi-stage transmissions shown in FIGS. 1, 2 and 3, the following gears can be shifted:

A first gear can be achieved by the engaged first brake 51, the engaged second clutch 62 and the engaged fourth clutch 64.

A second gear can be achieved by the engaged first brake 51, the engaged second brake 52 and the engaged fourth clutch 64.

A third gear can be achieved by the engaged first brake 51 the engaged third clutch 63 and the engaged fourth clutch 64.

A fourth gear can be achieved by the engaged second brake 52, the engaged third clutch 63 and the engaged fourth clutch 64.

A fifth gear can be achieved by the engaged first clutch 61, the engaged third clutch 63 and the engaged fourth clutch 64, or by the engaged first clutch 61, the engaged second clutch 62 and the engaged fourth clutch 64.

A sixth gear can be achieved by the engaged second brake 52, the engaged first clutch 61 and the engaged fourth clutch 64.

A seventh gear can be achieved by the engaged second brake 52, the engaged first clutch 61 and the engaged third clutch 63.

An eighth gear can be achieved by the engaged first brake 51, the engaged second brake 52 and the engaged first clutch 61.

A ninth gear can be achieved by the engaged first brake 51, the engaged first clutch 61 and the engaged third clutch 63.

A reverse gear can be achieved by the engaged first brake 51, the engaged second clutch 62 and the engaged third clutch 63.

An additional forward gear can be achieved by the engaged second brake 52, the engaged second clutch 62 and the engaged third clutch 63.

An additional reverse gear can be achieved by the engaged second brake 52, the engaged second clutch 62 and the engaged fourth clutch 64.

The shift elements that are not mentioned in each case are disengaged.

Figure 11:
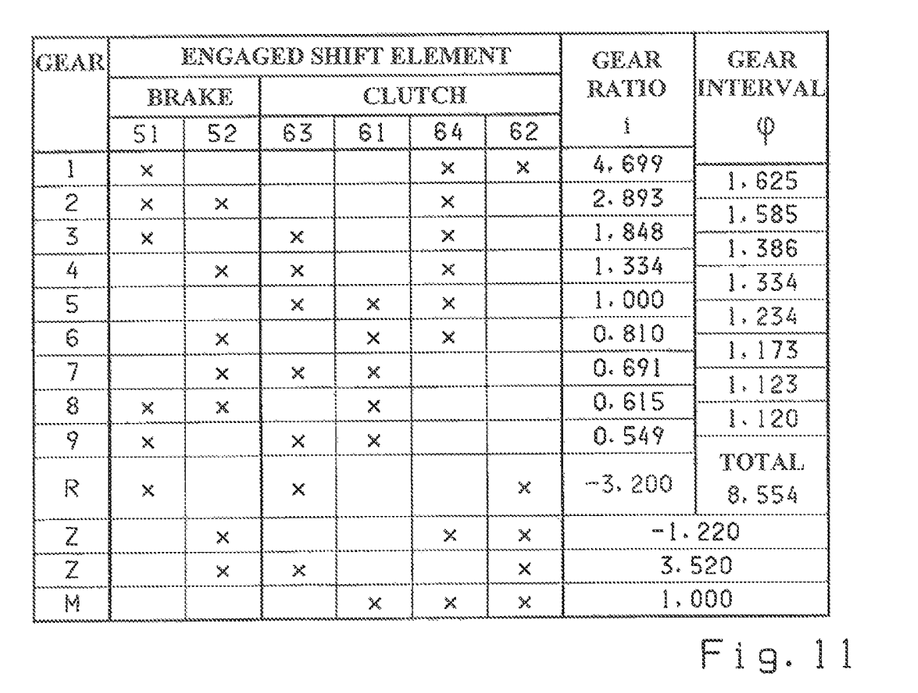
FIG. 11 shows a table indicating the engaged shift elements in each gear step for the transmission variants shown in FIGS. 1 to 3.

This is also shown in the table in FIG. 11 which also shows the transmission ratios of the respective gear steps.

The shift positions of the multi-stage transmissions shown in FIGS. 4 to 6 are quite similar to those of the multi-stage transmission shown in FIGS. 1 to 3, but the fifth clutch 65 takes the place of the fourth clutch 64.

The shift positions of the multi-stage transmission shown in FIG. 7 are quite similar to those of the multi-stage transmission shown in FIGS. 1 to 3, but the sixth clutch 66 takes the place of the fourth clutch 64.

The shift positions of the multi-stage transmission shown in FIG. 8 are quite similar to those of the multi-stage transmission shown in FIGS. 1 to 3, but the seventh clutch 67 takes the place of the third clutch 63.

The shift positions of the multi-stage transmission shown in FIG. 9 are quite similar to those of the multi-stage transmission shown in FIG. 8, but the fifth clutch 65 takes the place of the fourth clutch 64.

The shift positions of the multi-stage transmission shown in FIG. 10 are quite similar to those of the multi-stage transmission shown in FIG. 8, but the sixth clutch 66 takes the place of the fourth clutch 64.

In the illustrated multi-stage transmissions, preferably the first gear set 1 is configured as a plus gear set and the remaining gear sets 2, 3, 4 are configured as minus gear sets.

In one advantageous variant, the transmission ratio:
of the first gear set 1 between the sun gear 11 and the ring gear 13 is +1.600 and/or
of the second gear set 2 between the sun gear 21 and the ring gear 23 is −3,200 and/or
of the third gear set 3 between the sun gear 31 and the ring gear 33 is −3.700 and/or
of the fourth gear set 4 between the sun gear 41 and the ring gear 43 is −1.600.

Figure 1A:
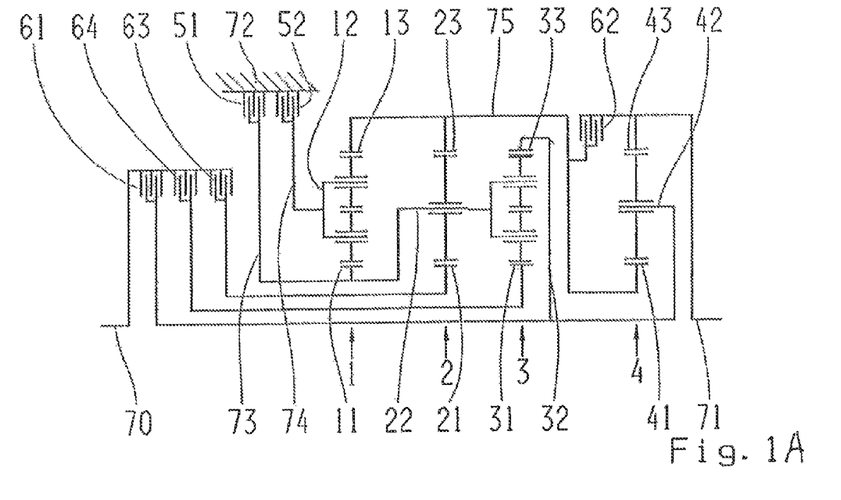
FIG. 1A shows a variant of this figure.

In general, instead of a first specified connection/coupling to a carrier 12, 22, 32, 42 of a gear set 1, 2, 3, 4 and a second specified connection/coupling to a ring gear 13, 23, 33, 43 of this gear set 1, 2, 3, 4, the first specified connection/coupling is formed to the ring gear 13, 23, 33, 43 of this gear set 1, 2, 3, 4 and the second specified connection/coupling is formed to the carrier 12, 22, 32, 42 of this gear set 1, 2, 3, 4, wherein this gear set 1, 2, 3, 4 is configured as a plus gear set instead of as a minus gear set and as a minus gear set instead of as a plus gear set, respectively. In other words, the connections/couplings to the carrier 12, 22, 32, 42 and to the ring gear 13, 23, 33, 43 of a gear set 1, 2, 3, 4 are swapped and the direction of rotation between the sun gear 11, 21, 31, 41 and the ring gear 13, 23, 33, 43 of this gear set 1, 2, 3, 4 is reversed. An example of such variation is shown in FIG. 1A of the drawings. When designing the multi-stage transmission, care should 4 additionally be taken to ensure that the value of the stationary transmission ratio of this gear set is increased or decreased by 1 if the shiftable transmission ratios between the input drive 70 and the output drive 71 are otherwise to remain the same. By varying the gear sets 1, 2, 3, 4 in the specified manner, therefore, the connection/coupling between the individual transmission elements can be changed without changing the characteristic of the transmission. A large number of design embodiments are thus available which may simplify the implementation of the transmission in the case in question. The aforementioned swapping of the connection/coupling is not limited to one gear set 1, 2, 3, 4 but rather can also be applied simultaneously to a plurality of gear sets 1, 2, 3, 4.

The example embodiments show possible variant embodiments of a multi-stage transmission according to the invention, wherein it should be noted at this point that the invention is not limited to the specifically shown variant embodiments thereof, but rather various combinations of the individual variant embodiments with one another are also possible, and this possibility for variation based on the technical teaching of the present invention lies within the capability of a person skilled in the art operating in this technical field. In particular, the possibilities which are obvious from the combinatorics but which are not explicitly shown in the figures are also covered by the scope of protection. In addition, all conceivable variant embodiments which are possible through combinations of individual details of the variant embodiments that have been shown and described are also covered by the scope of protection.

As a matter of form, it should finally be pointed out that, for a better understanding of the structure of the multi-stage transmission, the latter is shown schematically in the figures and therefore in reality may comprise more components than shown, fewer components than shown, or also other components. In general, the specific design lies within the capability of a person skilled in the art.

The problem addressed by the stand-alone inventive solutions can be found in the description.

LIST OF REFERENCE CHARACTERS 1 first transmission gear set
2 second transmission gear set
3 third transmission gear set
4 fourth transmission gear set
11 sun gear of the first transmission gear set
12 carrier of the first transmission gear set
13 ring gear of the first transmission gear set
21 sun gear of the second transmission gear set
22 carrier of the second transmission gear set
23 ring gear of the second transmission gear set
31 sun gear of the third transmission gear set
32 carrier of the third transmission gear set
33 ring gear of the third transmission gear set
41 sun gear of the fourth transmission gear set
42 carrier of the fourth transmission gear set
43 ring gear of the fourth transmission gear set 51 first brake
52 second brake
61 first clutch
62 second clutch
63 third clutch
64 fourth clutch
65 fifth clutch
66 sixth clutch
67 seventh clutch
70 input drive
71 output drive
72 housing
73 . . . 75, 76, 77, 78 shaft

The invention claimed is:

1. A multi-stage transmission comprising:
a housing (72),
a drive shaft (70),
an output shaft (71);
at least first, second, third and fourth planetary gear sets (1, 2, 3, 4), each of the first, the second, the third and the fourth planetary gear sets comprising a sun gear, a ring gear and a carrier;
wherein the ring gear (13) of the first planetary gear set (1) is permanently connected to the sun gear (41) of the fourth planetary gear set (4);
the ring gear (43) of the fourth planetary gear set (4) is permanently connected to the output shaft (71);
the sun gear (11) of the first planetary gear set (1) and the carrier (22) of the second planetary gear set (2) are both connectable to the housing (72) via a first brake (51);
the carrier (12) of the first planetary gear set (1) is connectable to the housing (72) via a second brake (52);
one of:
  the carrier (32) and the sun gear (31) of the third planetary gear set (3) are connectable via a first clutch,
  the ring gear (33) and the sun gear (31) of the third planetary gear set (3) are connectable via the first clutch,
  the ring gear (33) and the carrier (32) of the third planetary gear set (3) are connectable via the first clutch, and
  the drive shaft (70) and the carrier (42) of the fourth planetary gear set (4) are connectable via the first clutch (61);
one of:
  the ring gear (43) and the sun gear (41) of the fourth planetary gear set (4) are connectable via a second clutch (62),
  the ring gear (43) and the carrier (42) of the fourth planetary gear set (4) are connectable via the second clutch,
  the sun gear (41) and the carrier (42) of the fourth planetary gear set (4) are connectable via the second clutch (62); and
three of first, second, third, fourth and fifth connections are permanent connections and two of the first, the second, the third, the fourth and the fifth connections are releasable connections which are released by at least one shift element:
  the first connection connects the drive shaft (70) to the sun gear (21) of the second planetary gear set (2);
  the second connection connects the drive shaft (70) to the sun gear (31) of the third planetary gear set (3);
  the third connection connects the ring gear (33) of the third planetary gear set (3) to the carrier (22) of the second planetary gear set (2);
  the fourth connection connects the carrier (32) of the third planetary gear set (3) to the carrier (42) of the fourth planetary gear set (4); and
  the fifth connection connects a ring gear (13) of the first planetary gear set (1) to the ring gear (23) of the second planetary gear set (2).

2. The multi-stage transmission according to claim 1, wherein
the drive shaft (70) is connectable to the sun gear (21) of the second planetary gear set (2) via a third clutch (63); and
the ring gear (13) of the first planetary gear set (1) is permanently connected to the ring gear (23) of the second planetary gear set (2).

3. The multi-stage transmission according to claim 2, wherein
the drive shaft (70) is connectable to the sun gear (31) of the third planetary gear set (3) via a fourth clutch (64);
the ring gear (33) of the third planetary gear set (3) is permanently connected to the carrier (22) of the second planetary gear set (2); and
the carrier (32) of the third planetary gear set (3) is permanently connected to the carrier (42) of the fourth planetary gear set (4).

4. The multi-stage transmission according to claim 2, wherein
the drive shaft (70) is permanently connected to the sun gear (31) of the third planetary gear set (3);
the ring gear (33) of the third planetary gear set (3) is connectable to the carrier (22) of the second planetary gear set (2) via a fourth clutch (65); and
the carrier (32) of the third planetary gear set (3) is permanently connected to the carrier (42) of the fourth planetary gear set (4).

5. The multi-stage transmission according to claim 2, wherein
the drive shaft (70) is permanently connected to the sun gear (31) of the third planetary gear set (3);
the ring gear (33) of the third planetary gear set (3) is permanently connected to the carrier (22) of the second planetary gear set (2); and
the carrier (32) of the third planetary gear set (3) is connectable to the carrier (42) of the fourth planetary gear set (4) via a fourth clutch (66).

6. The multi-stage transmission according to claim 1, wherein
the drive shaft (70) is permanently connected to the sun gear (21) of the second planetary gear set (2); and
the ring gear (13) of the first planetary gear set (1) is connectable to the ring gear (23) of the second planetary gear set (2) via a fourth clutch (67).

7. The multi-stage transmission according to claim 6, wherein
the drive shaft (70) is couplable to the sun gear (31) of the third planetary gear set (3) via the fourth clutch (64);
the ring gear (33) of the third planetary gear set (3) is permanently connected to the carrier (22) of the second planetary gear set (2); and
the carrier (32) of the third planetary gear set (3) is permanently connected to the carrier (42) of the fourth planetary gear set (4).

8. The multi-stage transmission according to claim 6, wherein
the drive shaft (70) is permanently connected to the sun gear (31) of the third planetary gear set (3);
the ring gear (33) of the third planetary gear set (3) is connectable to the carrier (22) of the second planetary gear set (2) via the fourth clutch (65); and the carrier (32) of the third planetary gear set (3) is permanently connected to the carrier (42) of the fourth planetary gear set (4).

9. The multi-stage transmission according to claim 6, wherein
the drive shaft (70) is permanently connected to the sun gear (31) of the third planetary gear set (3);
the ring gear (33) of the third planetary gear set (3) is permanently connected to the carrier (22) of the second planetary gear set (2); and
the carrier (32) of the third planetary gear set (3) is connectable to the carrier (42) of the fourth planetary gear set (4) and to a further shaft (78) via the fourth clutch (66).

10. The multi-stage transmission according to claim 3, wherein selective engagement of three of the first and the second brakes and the first, the second, the third and the fourth clutches implements a plurality of gears;
a first gear is implemented by engagement of the first brake (51), the second clutch (62) and the fourth clutch (64, 65, 66),
a second gear is implemented by engagement of the first brake (51), the second brake (52) and the fourth clutch (64, 65, 66),
a third gear is implemented by engagement of the first brake (51), the third clutch (63, 67) and the fourth clutch (64, 65, 66),
a fourth gear is implemented by engagement of the second brake (52), the third clutch (63, 67) and the fourth clutch (64, 65, 66),
a fifth gear is either implemented by engagement of the first clutch (61), the third clutch (63, 67) and the fourth clutch (64, 65, 66) or by engagement of the first clutch (61), the second clutch (62) and the fourth clutch (64, 65, 66),
a sixth gear is implemented by engagement of the second brake (52), the first clutch (61) and the fourth clutch (64, 65, 66),
a seventh gear is implemented by engagement of the second brake (52), the first clutch (61) and the third clutch (63, 67),
an eighth gear is implemented by engagement of the first brake (51), the second brake (52) and the first clutch (61),
a ninth gear is implemented by engagement of the first brake (51), the first clutch (61) and the third clutch (63, 67),
a reverse gear is implemented by engagement of the first brake (51), the second clutch (62) and the third clutch (63, 67),
an additional forward gear is implemented by engagement of the second brake (52), the second clutch (62) and the third clutch (63, 67), and
an additional reverse gear is implemented by engagement of the second brake (52), the second clutch (62) and the fourth clutch (64, 65, 66).

11. The multi-stage transmission according to claim 7, wherein selective engagement of three of the first and the second brakes and the first, the second, third and the fourth clutches implements a plurality of gears;
a first gear is implemented by engagement of the first brake (51), the second clutch (62) and the fourth clutch (64, 65, 66),
a second gear is implemented by engagement of the first brake (51), the second brake (52) and the fourth clutch (64, 65, 66),
a third gear is implemented by engagement of the first brake (51), the third clutch (67) and the fourth clutch (64, 65, 66),
a fourth gear is implemented by engagement of the second brake (52), the third clutch (67) and the fourth clutch (64, 65, 66),
a fifth gear is implemented either by engagement of the first clutch (61), the third clutch (67) and the fourth clutch (64, 65, 66) or by engagement of the first clutch (61), the second clutch (62) and the fourth clutch (64, 65, 66),
a sixth gear is implemented by engagement of the second brake (52), the first clutch (61) and the fourth clutch (64, 65, 66),
a seventh gear is implemented by engagement of the second brake (52), the first clutch (61) and the third clutch (67),
an eighth gear is implemented by engagement of the first brake (51), the second brake (52) and the first clutch (61),
a ninth gear is implemented by engagement of the first brake (51), the first clutch (61) and the third clutch (67),
a reverse gear is implemented by engagement of the first brake (51), the second clutch (62) and the third clutch (67),
an additional forward gear is implemented by engagement of the second brake (52), the second clutch (62) and the third clutch (67), and
an additional reverse gear is implemented by engagement of the second brake (52), the second clutch (62) and the fourth clutch (64, 65, 66).

12. The multi-stage transmission according to claim 1, wherein
the first planetary gear set (1) is a plus planetary gear set,
the second planetary gear set (2) is a minus planetary gear set,
the third planetary gear set (3) is a minus planetary gear set, and
the fourth planetary gear set (4) is a minus planetary gear set.

13. The multi-stage transmission according to claim 12, wherein at least one of:
a transmission ratio of the first planetary gear set (1), between the sun gear (11) and the ring gear (12) thereof, is +1.600;
a transmission ratio of the second planetary gear set (2), between the sun gear (21) and the ring gear (22) thereof, is −3.200;
a transmission ratio of the third planetary gear set (3), between the sun gear (31) and the ring gear (32) thereof, is −3.700;
a transmission ratio of the fourth planetary gear set (4), between the sun gear (41) and the ring gear (42) thereof, is −1.600.

14. The multi-stage transmission according to claim 1, wherein the second clutch (62) and a fourth clutch (64, 65, 66) are configured as claw clutches.

15. A multi-stage transmission comprising:
a housing (72),
a drive shaft (70),
an output shaft (71);
at least first, second, third and fourth planetary gear sets (1, 2, 3, 4), each of the first, the second, the third and the fourth planetary gear sets comprising a first element, a second element and a third element;
wherein the second element (13) of the first planetary gear set (1) is permanently connected to the first element (41) of the fourth planetary gear set (4);

the third element (43) of the fourth planetary gear set (4) is permanently connected to the output shaft (71);

the first element (11) of the first planetary gear set (1) and the second element (22) of the second planetary gear set (2) are both connectable to the housing (72) via a first brake (51);

the third element (12) of the first planetary gear set (1) is connectable to the housing (72) via a second brake (52);

one of:
- the second element (32) and the first element (31) of the third planetary gear set (3) are connectable via a first clutch,
- the third element (33) and the first element (31) of the third planetary gear set (3) are connectable via the first clutch,
- the third element (33) and the second element (32) of the third planetary gear set (3) are connectable via the first clutch, and
- the drive shaft (70) and the second element (42) of the fourth planetary gear set (4) are connectable via the first clutch;

one of:
- the third element (43) and the first element (41) of the fourth planetary gear set (4) are connectable via a second clutch (62),
- the third element (43) and the second element (42) of the fourth planetary gear set (4) are connectable via the second clutch,
- the first element (41) and the second element (42) of the fourth planetary gear set (4) are connectable via the second clutch (62); and three of first, second, third, fourth and fifth connections are permanent connections and two of the first, the second, the third, the fourth and the fifth connections are releasable connections which are released by at least one shift element:
- the first connection connects the drive shaft (70) to the first element (21) of the second planetary gear set (2);
- the second connection connects the drive shaft (70) to the first element (31) of the third planetary gear set (3);
- the third connection connects the third element (33) of the third planetary gear set (3) to the second element (22) of the second planetary gear set (2);
- the fourth connection connects the second element (32) of the third planetary gear set (3) to the second element (42) of the fourth planetary gear set (4); and
- the fifth connection connects the second element (13) of the first planetary gear set (1) to the third element (23) of the second planetary gear set (2); and the first element is a sun gear, and
- for each of the first, the second, the third and the fourth planetary gear set which are configured as a minus gear set, the second element is a carrier of that planetary gear set and the third element is a ring gear of the planetary gear set;
- while for each of the first, the second, the third and the fourth planetary gear set which are configured as a plus-gear set, the second element is a ring gear of that plus planetary gear set and the third element is a carrier of that plus planetary gear set.

* * * * *